July 28, 1942. R. A. MULL 2,291,053
TESTING DEVICE
Filed Aug. 2, 1940 3 Sheets-Sheet 1
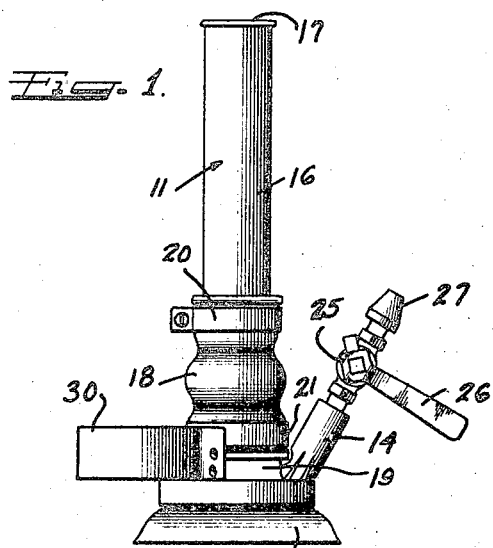
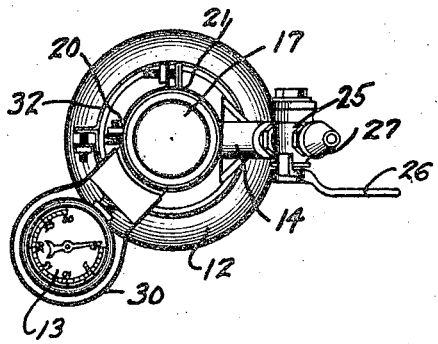
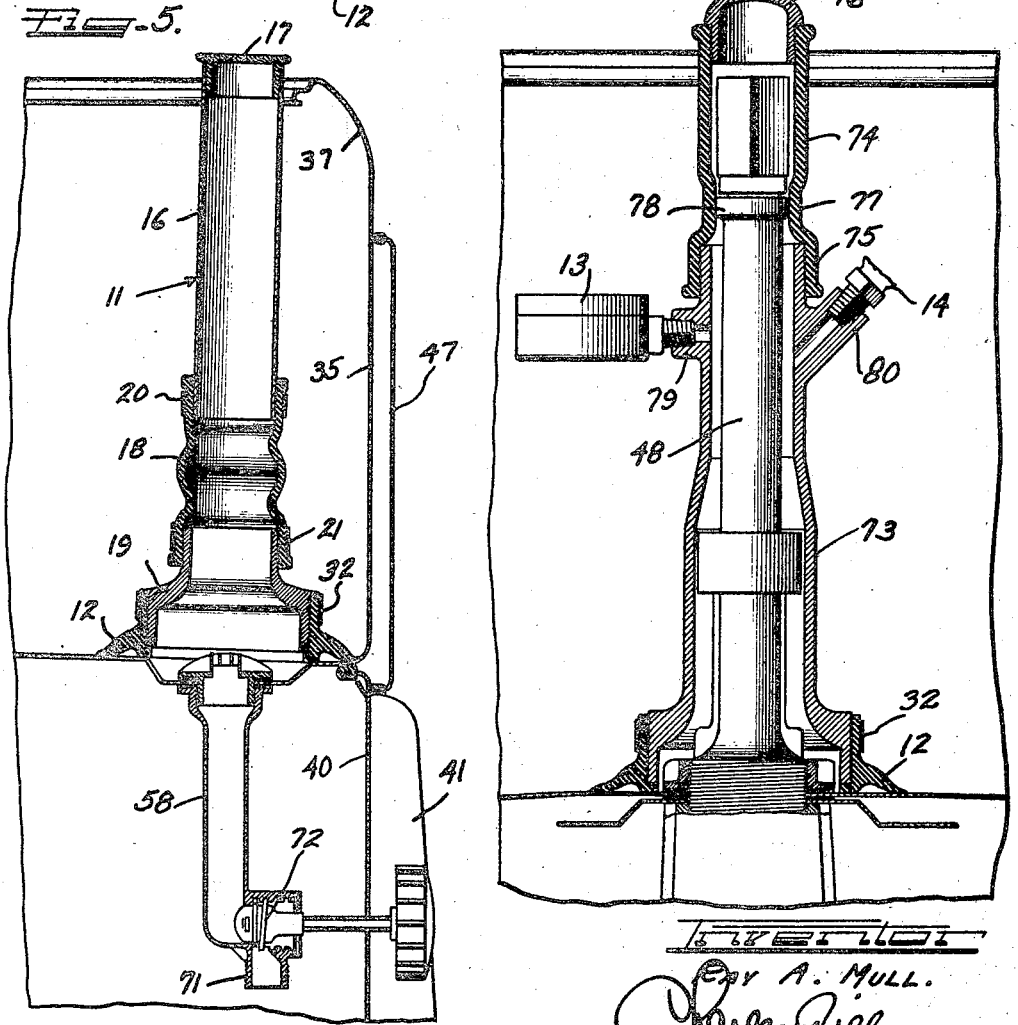

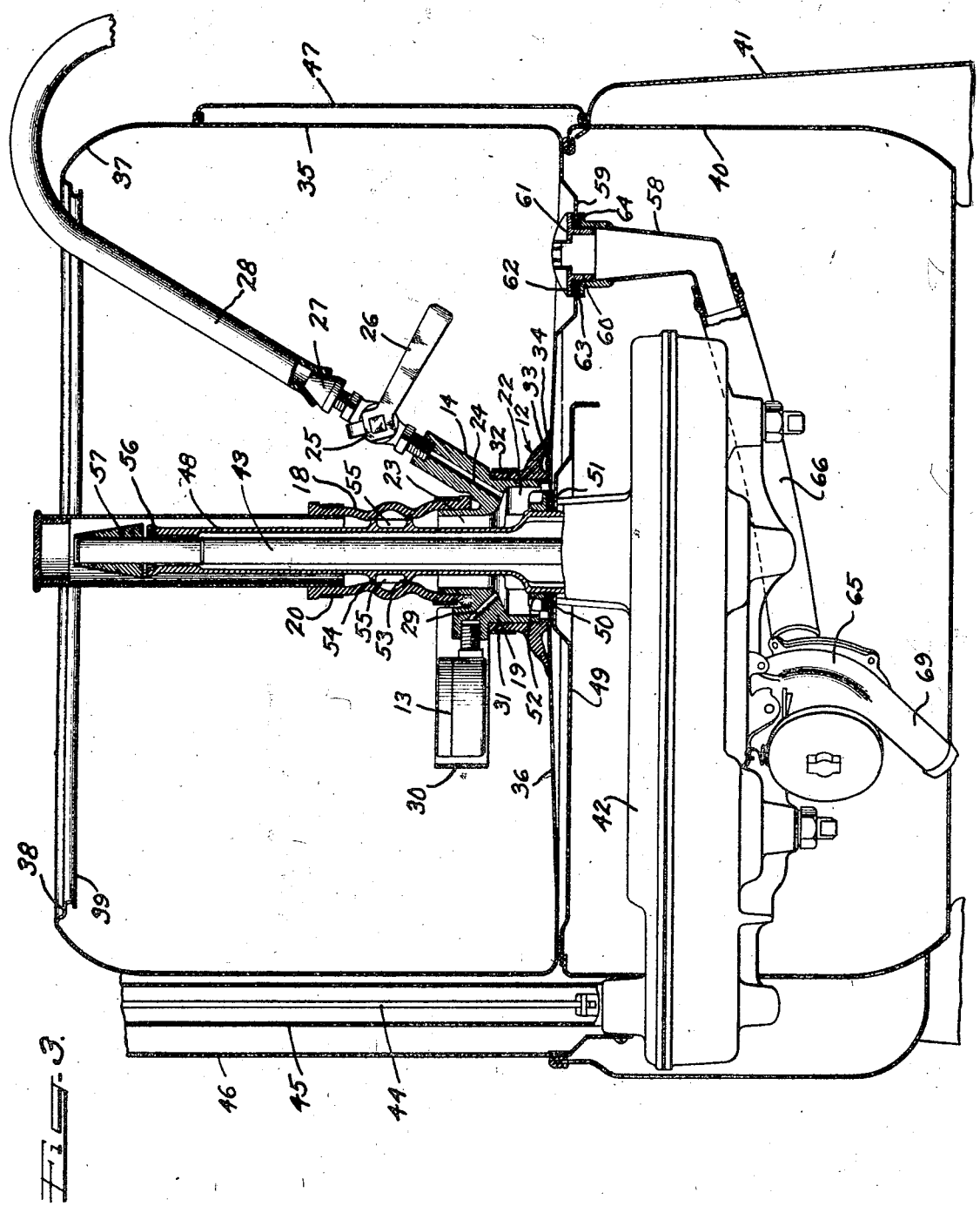

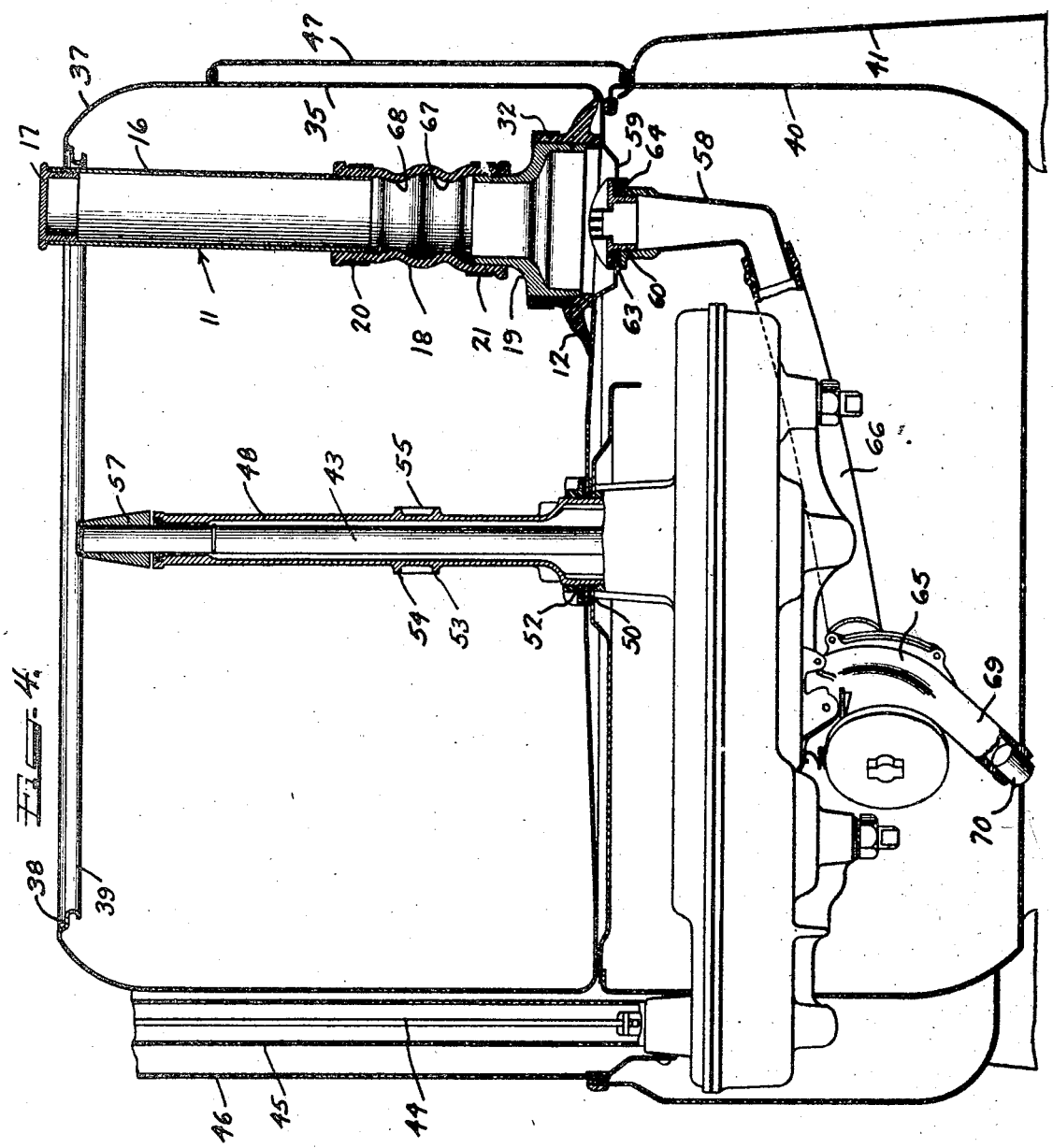

Patented July 28, 1942

2,291,053

UNITED STATES PATENT OFFICE 2,291,053

TESTING DEVICE

Ray A. Mull, Benton Harbor, Mich., assignor of one-half to Nineteen Hundred Corporation, St. Joseph, Mich., a corporation of New York Application August 2, 1940, Serial No. 349,902

10 Claims. (Cl. 73—51)

This invention relates to a testing device for plumbing fixtures, and more particularly to a vacuum testing device for determining the fluid tightness of joints in washing machines and the like.

One common form of domestic washing machine includes a tub having an agitator mounted centrally therein for scrubbing clothes. The agitator is disposed over a hollow center post which projects upwardly from the base of the tub. The drive shaft for the agitator extends up through the center post and directly carries the agitator. Since the operating mechanism for the agitator is located below the tub, which necessitates passing the drive shaft through the base of the tub, it is clear that fluid-tight joint must be provided between the hollow center post and the tub. This same tub is also provided with an outlet pipe which is either directly connected to an exhaust pump or to a drain pipe which enables the tub to be emptied of water when desired. The joint between the outlet pipe and the tub must also be fluid tight.

In the past these joints have usually been tested by partially filling the tube with water, with the outlet pipe closed off, and then noting whether there is any leakage of water in the joints. This test was always made prior to the time when the washing machine was painted. It will at once be appreciated by those skilled in this art that this test was a cumbersome manufacturing operation, for after emptying the tub it was always necessary to set the tub aside for a sufficient length of time to permit it to become thoroughly dry before painting.

The present invention provides a testing device which is particularly suitable for determining the fluid tightness of plumbing fixture joints in washing machines, and which will do away with the burdensome and time-consuming test above described.

More specifically, it is an object of the present invention to provide a novel vacuum testing device for plumbing fixtures, and particularly a device suitable for determining the fluid tightness of plumbing fixtures in washing machines and the like.

Another object of the present invention is to provide a novel testing device which is economical to manufacture, which is rugged and reliable in use, and which enables a very rapid test to be made for the fluid tightness of plumbing fixtures.

A further object of the present invention is to provide a novel vacuum testing device having an elongated tubular housing, at least a portion of which is flexible, and which flexible portion includes a restricted throat portion.

Another and further object of the present invention is to provide a novel testing device having an elongated tubular housing arranged to be disposed over the center post of a domestic washing machine and including means for effecting a seal between the center post and the tubular housing at a point spaced from the upper end thereof, and which tubular housing is also provided with a suction ring at its lower end for making a fluid-tight seal with the base of the tub adjacent the center post.

Another and still further object of the present invention is to provide a novel method for testing the fluid tightness of fixtures projecting through the tube of a domestic washing machine.

The novel features which I believe characteristic of my invention are set forth with particularity in the appended claims. My invention itself, however, both as to its manner of construction and method of operation, together with further objects and advantages thereof, may best be understood by reference to the following description taken in connection with the accompanying drawings, in which:

Figure 1 is an elevational view of one embodiment of my testing device;

Figure 2 is a plan view of the testing device shown in Figure 1;

Figure 3 is a partial vertical sectional view through a washing machine showing the testing device of Figure 1 disposed in testing position over the center post of the machine.

Figure 4 is a partial vertical sectional view similar to Figure 3 but showing the testing device disposed in testing position over the outlet pipe of the tub of the machine;

Figure 5 is a partial sectional view showing the testing device disposed in testing position over the tub outlet of a washing machine where the tub outlet is in the form of a gravity drain rather than a pump as shown in Figure 4; and Figure 6 is a partial sectional view showing a modified form of vacuum testing device.

In Figures 1 to 5 of the drawings, I have illustrated one embodiment of the present invention; Figures 1 and 2 illustrating the general appearance of the testing device, while Figures 3 to 5 illustrating the testing device in detail and in proper testing position on a domestic washing machine. The vacuum testing device of Figures 1 to 5 includes an elongated tubular housing assembly 11 having a suction ring 12 at its lower end, a vacuum gauge 13 for indicating the degree of vacuum within the housing, and an exhaust conduit 14 having a valve 25 therein by which the tubular housing may be connected to a suitable exhaust pump (not shown).

The elongated tubular housing assembly 11 comprises a metal sleeve 16 which is closed and sealed at its upper end by a cap 17, a flexible rubber sleeve 18, which is corrugated circumferentially, and a base member 19 which is preferably in the form of a casting. The upper end of the corrugated flexible rubber tubing 18 is telescoped over the lower end of the metal tube 16 and is preferably held in place by a metal band 20. The lower end of the corrugated flexible rubber tubing 18 is telescoped over the upper end of the casting 19 and is firmly held in place by a second metal band 21.

As may be seen best in Figure 3 of the drawings, the casting 19 is formed with a relatively large lower chamber 22 and a somewhat smaller upper chamber 23 which directly opens into the lower chamber 22. The exhaust conduit 14 is formed as an integral part of the casting 19 and is in the form of a relatively long, narrow boss having a passageway 24 extending therethrough into communication with the chamber 22. A valve member 25 is mounted on the end of the exhaust conduit 14 and is provided with an operating handle 26 for opening and closing the valve. The valve member 25 may be of any suitable type of construction which can completely shut off the chamber 22. The upper end of the valve member 25 is provided with a tapered head 27 over which the end of a rubber hose 28 may be forced and held in position by hand. The hose 28 is connected with an exhaust pump (not shown).

Also mounted on the base member or casting 19 is the vacuum gauge 13, which indicates the degree of vacuum within the chamber 22. A passageway 29 extends through the wall of the casting 19 and connects the vacuum gauge 13 with the chamber 22. To prevent the vacuum gauge 13 from being damaged under repeated use of the testing device a guard rail 30 is preferably provided which is mounted on and carried by the base member or casting 19 and which extends around the vacuum gauge 13 in spaced relation thereto (see Figures 2 and 3).

The suction ring 12, which temporarily seals the lower end of the testing device in desired operating position, has an upstanding flange 31 which fits snugly around the lower portion of the base member or casting 19 and is tightly secured thereto by a metal band or strap 32. The suction ring 12 is also provided with a short downwardly extending inner flange 33 and a radially outwardly projecting lip portion 34. The area between the downwardly projecting flange 33 and the lip 34 provides a groove to obtain the desired "suction cup" effect.

In order to illustrate the manner in which the testing device is used, I have shown in Figures 3 and 4 a portion of one form of domestic washing machine. The washing machine illustrated includes, in general, a tub 35 of substantially cylindrical form having a base 36. The upper portion 37 of the tub 35 is curved slightly inwardly and terminates in a flat ledge portion 38 and a curled lip 39. The flat ledge portion 38 provides a support for a lid (not shown). The tub 35 is supported on a base frame 40, which is carried by four legs 41 in any suitable and convenient manner. The base frame 40 carries a motor (not shown) in a concealed position beneath the tub 35 and also carries a gear case 42 which houses the transmission mechanism for transmitting power to the agitator (which is not on the washing machine assembly while the testing device is being used) and the ringer mechanism (not shown).

As will readily be understood by those skilled in the art, connections are provided from the motor through the operating means within the gear case to the vertically disposed shaft 43. This shaft is suitably mounted in bearings carried by the gear case and extend upwardly through the opening in the bottom of the tub 35. The motor is also connected through the operating means in the gear case to the vertically disposed shaft 44, which extends upwardly outside of the tub 35 and within a tubular housing 45. In the form of washing machine shown in Figure 3 an outer ornamental jacket or shell 46 of generally U-shaped cross section extends around the tubular housing 45 and is welded or otherwise suitably secured to the adjacent wall portion of the tub 35. A second ornamental shell or jacket 47 extends around the tub 35 and terminates adjacent the ornamental shell 46.

A hollow center post 48 surrounds the greater portion of the shaft 43 and in spaced relation thereto. The center post 48 is mounted in the base 36 of the tub 35 and also in the upper cover plate 49 of the base frame 40. To prevent leakage of water at the point where the center post 48 passes through the base 36, a fluid-tight joint must be made at this point. As shown in the drawings, this is provided by a pair of gaskets 50 and 51 disposed on opposite sides of the base 36. The gaskets 50 and 51 are tightly clamped in place by a clamping ring 52 which is threaded onto the lower end of the center post 48 above the gasket 51.

The center post 48 is provided with a pair of ring flanges 53 and 54, which rings are connected by a plurality of vertically extending webs 55. The ring flanges 53 and 54 act as a guide bearing for the agitator which hangs down over the center post 48.

The upper end of the shaft 43 passes through a packing ring 56 carried by the upper end of the center post 48. The extreme upper end of the shaft 43 has a frusto-pyramidal block 57 rigidly secured thereto to form a seat for carrying the agitator (not shown).

The tub 35 is drained through an outlet pipe 58 which depends from a depressed portion 59 in the base of the tub 35. The outlet pipe 58 is internally threaded at its upper end for the reception of the threaded end 60 of the guard cap or strainer 61. A pair of gaskets 62 and 63 are disposed on opposite sides of the depressed section 59 of the tub 35 and are clamped tightly thereagainst by the threaded cap 61 and the shoulder 64 of the upper end of the pipe 58. In the form of washing machine shown in Figures 3 and 4, the pipe 58 is connected to a pump 65 through a flexible hose 66.

The manner in which the plumbing fixtures of the washing machine shown in Figures 3 and 4 are tested by my novel vacuum testing device for fluid tightness will now be described. It is to be understood that the test preferably takes place before the washing machine is painted but after it has been completely assembled with the exception of the agitator. As the washing machine comes along the factory assembly line, the testing device as shown in Figures 1 and 2 is placed down over the top of the center post 48 to the position as shown in Figure 3. In this position the suction ring 12 is seated on the base 36 of the tub 35, and the circumferentially corrugated tubing 18 is seated against the flange rings 53 and 54. In this connection, it will be noted that the corrugations of the flexible tubing 18 are so dimensioned and arranged that the narrow or restricted portions 67 and 68 are of slightly smaller diameter than the flange rings 53 and 54 and embrace them when the vacuum testing device is seated on the base of the tub. The valve 25 is turned to a position by the handle 26 to permit free communication with the chamber 22 from the flexible tubing 28, which is connected to a vacuum pump. In practice it has been found that it is simply necessary to set the vacuum testing device down in desired position over the center post 48 of the washing machine, open the valve 25, and then briefly hold the hose 28 against the tapered head 27 for a few moments. The valve 25 is then closed. Due to the fact that this operation has caused the chambers 22 and 23 to be exhausted, it will be appreciated that the seal made by the suction ring 12 is greatly enhanced due to the fact that the pressure on the outside of the ring tending to push it against the base 36 of the tub 35 is much greater than the pressure within the testing device. The vacuum within the elongated tubular housing assembly 11 also causes a very tight fit and seal between the corrugated rubber tubing 18 and the ring flanges 53 and 54, due to the fact that the atmospheric pressure is pushing radially inwardly on the tubing 18.

After the valve 25 has been shut off and the tubing 28 removed from the head 27, the vacuum gauge 13 is observed to determine whether there is any appreciable decrease in the vacuum which has been established within the chambers 22 and 23. If the vacuum is maintained, it will be obvious that the joints between the center post 48 and the base of the tub 35 is fluid tight. If, however, there is a faulty seal between the center post 48 and the base of the tub 35, the vacuum gauge will rapidly drop to zero, which indicates to the observer that the seal is imperfect.

While the degree of vacuum established within the vacuum testing device may vary through wide limits without departing from the spirit and scope of the present invention, it has been found in practice that a very satisfactory test can be obtained by exhausting the chamber 22 to about fifteen inches of mercury.

After the test has been made for the fluid tightness of the joint between the center post 18 and the base 36 of the tub 35, the vacuum testing device is removed from the center post 48 and placed over the outlet pipe 58 as shown in Figure 4. The testing device is turned approximately at ninety degrees to its position as shown in Figure 3 when placed over the outlet pipe 58 due to its proximity to the side wall of the tub 35. For that reason the valve 25 cannot be seen in the view as shown in Figure 4, since it is located directly behind the elongated tubular housing assembly 11. Before running the test on the joint between the outlet pipe 58 and the depressed portion 59 of the base 36 of the tub 35, the outlet 69 of the pump 65 is plugged up with a cork or other suitable stopper 70. The test is now run in exactly the same manner as previously described, and the vacuum gauge 13 is observed to determine whether there is a drop in the vacuum after the valve 25 has been shut off.

When the test is made for determining the fluid tightness of the joint between the outlet pipe 58 and the depressed portion 59, it will be observed that the entire tubular housing assembly 11 of the vacuum testing device is exhausted rather than just the lower portion thereof as was the case when the previous test was being made. It will be remembered that the upper end of the tubular housing assembly is completely closed off by the plug 17, and the only place where a leak can occur if the vacuum gauge indicates a falling-off of the vacuum is at the joint between the outlet pipe 58 and the tub 35 or in the pump 65 itself. While the test does not show which of these two places the leak is in, it does indicate that the washing machine is defective and must be removed from the general assembly line.

In Figure 5 of the drawings I have illustrated a modified form of washing machine wherein the outlet pipe 58 is connected to a drain 71 by a hand-operated valve 72. In running the test on the outlet pipe 58 of the washing machine as shown in Figure 5, the valve 72 is tightly closed off prior to the test. If the vacuum gauge 13 indicates that the vacuum is maintained within the tubular housing assembly 11 of the vacuum testing device, then the observer knows that the joint between the outlet pipe 58 and the tub 35 is fluid tight, as well as the valve 72.

In Figure 6 of the drawings I have illustrated a modified form of vacuum testing device which includes an elongated tubular housing member 73 formed of stiff material such as metal, and an upper tubular housing member 74 formed of rubber or other resilient material. The upper housing member 74 is sprung over the upper end of the lower housing member 73 as at 75. The upper end of the housing member 74 is closed off by a cap 76. An intermediate portion of the resilient housing member 74 is provided with a narrow or restricted throat region 77 for making a tight fit with the flange 78 on the center post 48. The lower end of the tubular housing 73 carries a suction ring 12 of the same type as previously described. This suction ring is tightly clamped to the lower end of the housing 73 by a clamping strap 32.

In the form of the invention shown in Figure 6, the vacuum gauge 13 and the exhaust conduit 14 are mounted in bosses 79 and 80 formed in the tubular housing 73 near the point on which the upper flexible housing 74 is secured. The test is made in exactly the same manner as previously described, but in this case it will be noted that the chamber which is exhausted extends up to a point in proximity to the top of the center post 48, while in the previous case the exhausted chamber extended up only a portion of the way or, in other words, to the flange rings 53 and 54.

While the vacuum testing device has been described in connection with testing the fluid tightness of plumbing fixtures on domestic washing machines, it will, of course, be understood that this novel testing device may be employed for testing a wide variety of plumbing fixtures.

While I have shown particular embodiments of my invention, it will, of course, be understood that I do not wish to be limited thereto, since many modifications may be made, and I, therefore, contemplate by the appended claims to cover all such modifications as fall within the true spirit and scope of my invention.

I claim as my invention:

1. A device for testing the fluid tightness of a joint between an upstanding fixture and a member on which said fixture is secured which comprises an elongated tubular housing having a closed end and an open end and arranged for disposition over said fixture, a suction ring on the lower end of said housing for completely sealing said housing against said memmber, a portion of said housing having a region of restricted diameter wherein said housing may directly engage said fixture and be sealed thereto, an exhaust conduit leading from the lower portion of said housing for connection to a vacuum pump, a shut-off valve in said exhaust conduit, and a vacuum indicator communicating with the lower portion of said housing and mounted thereon.

2. A device for testing the fluid tightness of a joint between an upstanding fixture and a member on which said fixture is mounted which comprises an elongated tubular housing having a closed and an open end arranged for disposition over said fixture, means on said housing for sealing its lower end to said member, an additional sealing means spaced from said first means for sealing said tubular housing to said fixture, thereby separating said housing into two chambers completely shut off from each other, an exhaust conduit leading from the lower chamber of said housing for connection to a vacuum pump, a shut-off valve in said conduit, and a vacuum indicator communicating with the lower chamber of said housing and mounted thereon.

3. A device for testing the fluid tightness of a joint between a plumbing fixture and a member on which said fixture is mounted which comprises an elongated tubular member formed of substantially inflexible material, a yieldable rubber sleeve secured to one end of said tubular member and forming a continuation thereof, said tubular member and said rubber sleeve forming an elongated tubular housing, a member mounted on and closing one end of said tubular housing, a base member including a suction ring mounted on and secured to the other end of said tubular housing, an exhaust conduit leading from said housing for connection to a vacuum pump, and a vacuum indicator communicating with said housing and mounted thereon.

4. A device for testing the fluid tightness of a joint between a plumbing fixture and a member on which said fixture is mounted which comprises an elongated tubular member formed of substantially inflexible material, a yieldable rubber sleeve secured to one end of said tubular member and forming a continuation thereof, said tubular member and said rubber sleeve forming an elongated tubular housing, a member mounted on and closing one end of said tubular housing, a base member including a suction ring mounted on and secured to the other end of said tubular housing, a conduit leading from said housing for connection to means for creating a difference in pressure between the inside and outside of said housing, and an indicator communicating with the interior of said housing and mounted thereon for indicating the extent of the difference in pressure between the inside of said housing and the outside of said housing.

5. A device for testing the fluid tightness of a joint between a plumbing fixture and a member on which the fixture is mounted, which comprises a tubular member closed at its upper end, a circumferentially corrugated sleeve of resilient material secured to the open end of said tubular member, a hollow base member mounted on the lower end of said resilient sleeve and communicating therewith, a suction ring secured to said base member and projecting outwardly and downwardly therefrom, a vacuum gauge mounted on said base member and communicating with the interior thereof, said base member having an exhaust conduit leading from the interior thereof and a shut-off valve mounted on the outer end of said exhaust conduit.

6. A device for testing the fluid tightness of a joint between a plumbing fixture and a member on which the fixture is mounted, said member having a substantially flat portion in proximity to said fixture, which comprises an elongated tubular housing arranged to be disposed over said fixture, means on said housing for completely sealing it against said member, a portion of said housing being formed of resilient material of slightly less diameter than said fixture and arranged to form a fluid-tight seal therewith, an exhaust conduit leading from said housing at a point between said resilient portion and said means for completely sealing it against said member, a manually operable valve mounted on said conduit and having a tapered head portion on the opposite side of said valve from said conduit for connection to a vacuum pump, and a vacuum gauge mounted on said housing and communicating with the interior thereof in the region of said exhaust conduit.

7. A testing device for determining the fluid tightness of a joint between the center post of a domestic washing machine and the tub on which it is mounted which comprises an elongated tubular housing closed at one end and open at the other end, said housing being arranged to be set down over said center post and be seated on the base of said tub, means on said housing for sealing its lower end to said base of said tub, additional means located intermediate the ends of said housing for sealing said housing to said center post, thereby providing a completely closed chamber in the lower portion of said housing, a passageway communicating with the lower portion of said housing arranged for connection to a vacuum pump, and a vacuum gauge connected to the lower portion of said housing.

8. A testing device for determining the fluid tightness of a joint between the center post of a domestic washing machine and the tub on which it is mounted, which comprises an elongated tubular housing closed at one end and open at the other end, said housing being arranged to be set down over said center post and be seated on the base of said tub, a suction ring on said housing for sealing the lower end thereof to the base of said tub, a portion of said housing being formed of resilient material and having a restricted throat region of slightly smaller diameter than the adjacent portion of said center post, whereby said housing is completely sealed to said center post at this point, thereby providing a completely closed chamber in the lower portion of said housing, a passageway communicating with the lower portion of said housing and arranged for connection to a vacuum pump, and a vacuum gauge connected to the lower portion of said housing.

9. A device for testing the fluid tightness of a joint between a comparatively flat member and an open-ended tubular member fixed thereto comprising an annular member large enough to encircle said tubular member, sealing means secured to said annular member and constructed and arranged to form a fluid-tight connection between said annular member and said comparatively flat member, a second sealing means secured to said annular member and constructed and arranged to form a fluid tight connection between said annular member and said tubular member, means for changing the amount of air within said annular member, and means for indicating the pressure of said air.

10. A device for testing the water tightness of the joint between the bottom of a washing machine tub and a hollow post projecting up therefrom, comprising an annular member large enough to encircle said post, an annular flexible member extending out from said first annular member and constructed and arranged to fit against said tub bottom, a second annular flexible member extending up from said first annular member and constructed and arranged to form a fluid-tight connection around said hollow post, means for withdrawing air from the space within said annular member, and a vacuum gauge communicating with said space.

RAY A. MULL.